July 10, 1956 C. V. SANTOCHI 2,754,014
AUTOMATIC MOTOR VEHICLE STORAGE AND TRANSFERRING DEVICE
Filed April 20, 1954 2 Sheets-Sheet 1
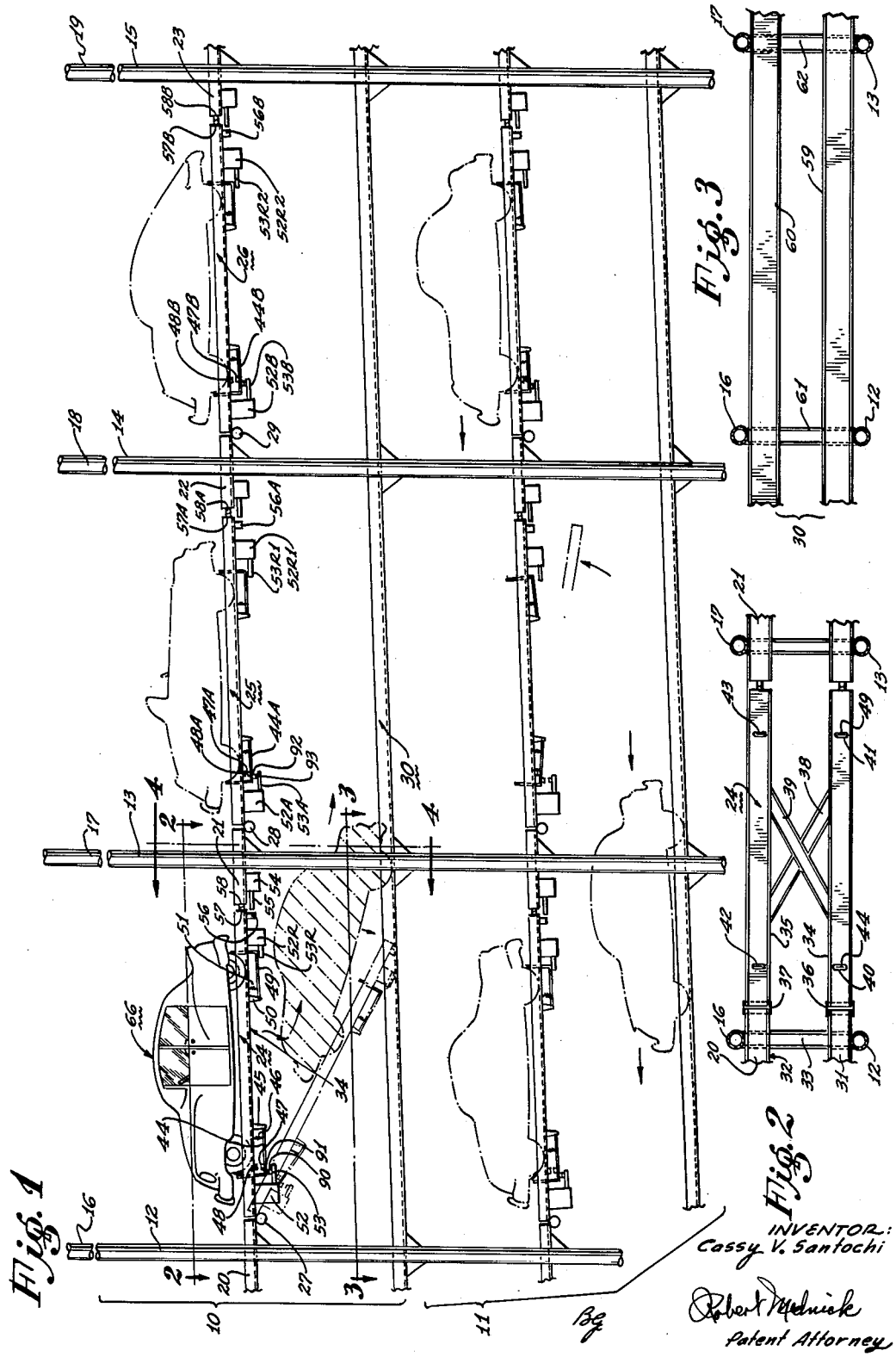
INVENTOR:
Cassy V. Santochi
Robert Melnick
Patent Attorney July 10, 1956   C. V. SANTOCHI   2,754,014
AUTOMATIC MOTOR VEHICLE STORAGE AND TRANSFERRING DEVICE
Filed April 20, 1954   2 Sheets-Sheet 2
Fig. 4
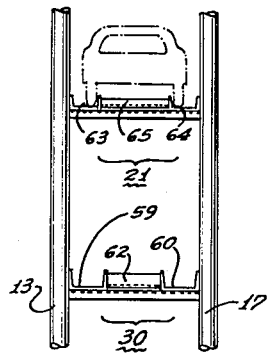
Fig. 5   Ramp Release Circuit
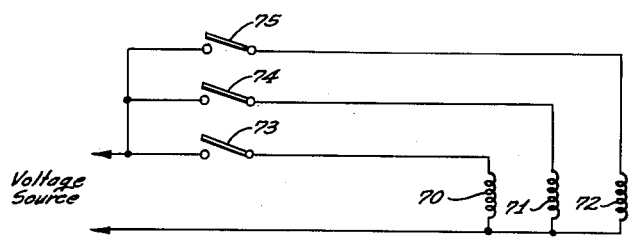
Fig. 6   Rear Guard Release Circuit
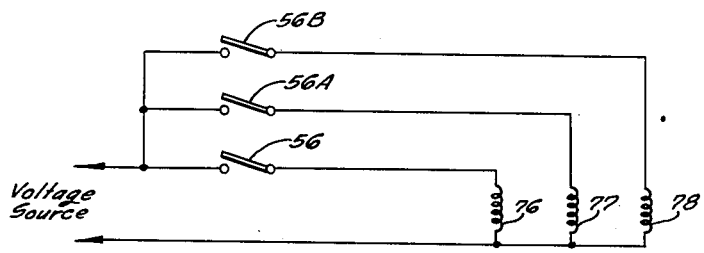
Fig. 7   Motor Vehicle Transfer Circuit
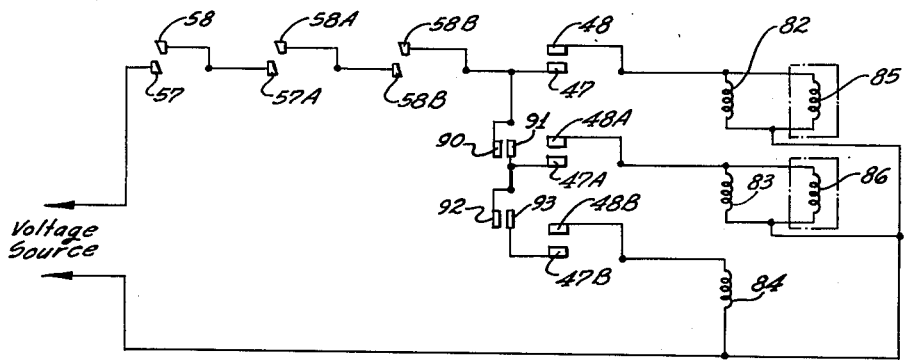
INVENTOR:
Cassy V. Santochi
Robert Hedrick
Patent Attorney

United States Patent Office 2,754,014
Patented July 10, 1956

2,754,014

AUTOMATIC MOTOR VEHICLE STORAGE AND TRANSFERRING DEVICE

Cassy V. Santochi, Los Angeles, Calif.

Application April 20, 1954, Serial No. 424,332

17 Claims. (Cl. 214—16.1)

This invention relates to improvements in storing devices and more particularly to storage devices for automatically storing and selectively transferring motor vehicles stored therein.

A garage or motor vehicle parking device should be capable of being conveniently operated for storing and transferring motor vehicles therein at a relatively high speed and low cost of operation, have a large storage utilization factor, and be economic to construct. In order to efficiently serve the needs of the users of the parking device, it is desirable that motor vehicles may be rapidly stored therein and rapidly removed therefrom. The manager or owner of the parking device would desire it to be economically operated and have a low construction cost.

The present invention provides for a parking device which has the aforementioned characteristics and comprises a structure having an inclined motor vehicle supporting surface or exit ramp and a plurality of similarly inclined motor vehicle storage supporting surfaces superimposed above the exit ramp. Each of the plurality of the storage supporting surfaces or ramps is constructed to conveniently store a motor vehicle thereon, and to be lowered at one end to allow the motor vehicle to roll onto the lower exit ramp or supporting surface.

All of the supporting surfaces are sufficiently inclined to allow a motor vehicle to slowly roll down the inclined surfaces due to the force of gravity. Wheel stops or guards are provided for controlling the movement of the motor vehicles on the plurality of inclined storage surfaces. Automatic controls are provided for selectively allowing one end of each of the plurality of storage supporting surfaces to be lowered by the weight of a motor vehicle stored thereon, for then controlling the movement of the wheel guards or stops to allow the motor vehicle to roll onto the exit supporting surface, and finally for controlling the movement of the wheel guards or stops to consecutively transfer motor vehicles stored on the plurality of motor vehicle storage supporting surfaces.

It is therefore an object of this invention to provide a device for storing and selectively transferring motor vehicles stored therein.

Another object of this invention is to provide an automatic device for rapidly storing and selectively transferring motor vehicles stored therein.

A further object of this invention is to provide a device for storing and selectively transferring motor vehicles which can be inexpensively constructed and is capable of economic operation.

Still another object of this invention is to provide an automatic storing and transferring device for motor vehicles which has a large storage utilization factor.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 illustrates a side elevation of a structure embodying this invention and showing two superimposed storage and transferring devices for motor vehicles, each device having entrance and exit supporting surfaces or ramps.

Fig. 2 illustrates a top plan view of the motor vehicle storage and transferring device taken on lines 2—2 of Fig. 1, and showing the top view of a motor vehicle storage supporting surface.

Fig. 3 illustrates a top plan view of the motor vehicle storage and transferring device taken on lines 3—3 of Fig. 1, and showing the top view of the exit ramp.

Fig. 4 illustrates an end elevation view of the structure shown in Fig. 1 and taken on lines 4—4.

Fig. 5 illustrates the electrical circuit for controlling the locking devices of the storage supporting surfaces of the device shown in Fig. 1.

Fig. 6 illustrates the electrical circuit for releasing the locking device for the rear wheel stops on the motor vehicle storage ramps when a motor vehicle storage ramp is rotatively lowered to the exit ramp.

Fig. 7 illustrates the electrical circuit for controlling the transfer of motor vehicles on the motor vehicle storage ramps or supporting surfaces.

Referring now more particularly to the drawings, there is shown in Fig. 1 a structure having two superimposed storage and transferring devices generally designated as 10 and 11. Structural columns 12, 13, 14 and 15 are in line with respect to each other and form the vertical supports for the structure in conjunction with structural columns 16, 17, 18 and 19 which are similarly in line and parallel to structural columns 12, 13, 14 and 15, respectively. As storage and transferring devices 10 and 11 are identical in construction and operation, only storage and transferring device 10 will be described in detail.

Horizontal supports for the structure are provided for by segmental ramps 20, 21, 22 and 23 which are securely attached by means of bolts, rivets, or the like to pairs of columns 12 and 16, 13 and 17, 14 and 18, and 15 and 19, respectively.

Motor vehicle storage ramps 24, 25 and 26 are rotatably hinged to segmental ramps 20, 21 and 22 by means of spring loaded hinges 27, 28 and 29 respectively. In addition, exit ramp 30 which is a continuous ramp is attached to the columns in the same manner as the segmental platforms and positioned below them to provide vertical clearance for a motor vehicle. The exit ramp and the motor vehicle storage ramps are slightly inclined with respect to the horizontal in order that a freely moving motor vehicle, that is a motor vehicle having its brakes released and being out of gear, may slowly roll down the inclined ramps due to the force of gravity.

Referring now to Fig. 2 taken along lines 2—2 of Fig. 1, there is shown a top plan view of the structure showing the construction of the segmental ramps 20 and 21 and of motor vehicle storage ramp 24. This view is representative of the segmental ramps and the motor vehicle storage ramps of Fig. 1. Segmental ramp 20 consists of channels 31 and 32 connected to columns 12 and 16 respectively, and are connected to each other by means of brace 33 which is shown as a channel and bolted to channels 31 and 32 by means of bolts or the like. Motor vehicle storage ramp 24 consists of channels 34 and 35 rotatably hinged to segmental ramp channels 31 and 32 by means of spring loaded hinges 36 and 37, respectively. Rigidity of the motor vehicle storage platform is provided for by cross braces 38 and 39 connected between channels 34 and 35 by means of bolts, or the like.

Channel 34 has slots 40 and 41 spaced to at least span the wheel base of a motor vehicle, and channel 35 has slots 42 and 43 similarly spaced. Segmental ramp 21 is similar to segmental ramp 20. All of the channels are of sufficient width to contain within the edges of the channels the wheels of a motor vehicle to be used in this structure and to allow for expansion of tires on the wheels if they become flat. For example, a 10 inch channel would be of sufficient width to accommodate the average size motor vehicle tires.

Referring now again to Fig. 1, channel 34 of motor vehicle storage ramp 24 has a front wheel guard or stop 44 rotatably mounted by guard support 45 and spring loaded by means of spring 46 so that the vertical portion of wheel guard 44 will extend through slot 40. Electrical contacts 47 and 48 are connected to and electrically insulated from channel 34 and front wheel guard 44, respectively. Similarly, rear wheel guard or stop 49 is connected to channel 34 by guard support 50 and spring 51. Front wheel guard locking device 52 consists of an electrically excitable solenoid mounted on appropriate supports such as a bracket and having a plunger 53. Mounted on a segmental platform 21 is motor vehicle ramp locking device 54 having a solenoid controlled plunger 55. Pressure switch 56 is mounted on motor vehicle ramp 24 as shown and is operated by pressure being applied to the underside thereof. Electrically insulated therefrom and between channel 34 and segmental platform 21 are electrical contacts 57 and 58. All of the aforementioned springs, stops, switches, etc. mounted on channel 34 are also provided for on channel 35 of motor vehicle storage ramp 24.

Referring now to Fig. 3 as taken along lines 3—3 of Fig. 1, there is shown a top plan view showing the construction of exit ramp 30 and consists of channels 59 and 60 secured to columns 12, 13, 16 and 17 and channel braces 61 and 62. In order to allow channels 34 and 35 of motor vehicle storage ramp 24 to fit within the edges of channels 59 and 60 when the storage ramp 24 is lowered, the latter channels are of greater width.

Fig. 4 shows a side view taken on lines 4—4 of Fig. 1. Columns 13 and 17 are shown spaced apart to accommodate a motor vehicle. Segmental ramp 21 includes channels 63 and 64 and connected between them is channel 65. Exit platform 30 includes continuous channels 59 and 60 and channel brace 62 to provide horizontal bracing between the continuous channels. It is to be noted that the only necessary vertical distance between the storage ramps and exit ramp is for the vertical height of a motor vehicle and for the vertical clearance to transfer a motor vehicle from a storage ramp to the exit ramp. Accordingly there will be a greater utilization of space than in the ordinary garages where garage attendants are necessary to move motor vehicles stored therein as greater distances between floors will be necessary in order to conveniently accommodate the garage attendants.

The operation of the storage and transferring device of this invention may be considered in two phases: first, the selection of a motor vehicle stored on one of the motor vehicle storage ramps and transferring the motor vehicle to the exit ramp, and secondly transferring the motor vehicles on the motor vehicle storage ramps in order that all the motor vehicles stored in the motor vehicle storage ramps occupy consecutive ramps starting from the bottom of the inclined grade of the motor vehicle storage ramps.

In considering the first mentioned phase of operation of this device, reference is made to Fig. 1. As was previously described, all controls, solenoids, springs, and other elements connected or attached to channel 34 of ramp 24 are duplicated on channel 35 of motor vehicle ramp 24, and reference thereto will be considered duplicated, both as to structure and mode of operation. For example, when the front wheel guard 44 on channel 34 is referred to as being in a certain position, then the corresponding wheel guard on channel 35 is in a similar position, or if plunger 53 is in a designated position then the corresponding plunger on channel 35 is in the same position.

Front wheel guard 44 is shown extending through slot 40 to press against the front wheel of motor vehicle 66 thus preventing any further movement of motor vehicle 66 down the inclined platform. The curved portion of the front wheel of motor vehicle 66 forces the front wheel guard 44 to move downwardly through slot 40 and rotate about hinge 45 until further movement is prevented by plunger 53 which is shown normally positioned when its solenoid is unexcited by an electrical voltage. However, sufficient movement of front wheel guard 44 is effected by force of the wheel of motor vehicle 66 to separate contacts 47 and 48. The motor vehicle storage ramp is prevented from rotatively lowering about spring loaded hinge 27 due to plunger 55 pressing against the underside of motor vehicle storage ramp 24. As seen in Fig. 1, plunger 55 is in the position where the solenoid of the motor vehicle ramp locking device 54 is unexcited by an applied voltage. Interlock switch contacts 57 and 58 are then electrically connected.

When a voltage is applied to the solenoid of the motor vehicle ramp locking device 54, plunger 55 will move away from under motor vehicle storage ramp 24. The weight of motor vehicle 66 will then cause the motor vehicle ramp 24 to rotatively lower about spring loaded hinge 27 and compress its spring. Motor vehicle 66 will then roll back and its rear wheels will press against rear wheel stop 49. Plunger 53R of rear wheel guard locking device 52R is in the position when its solenoid is unexcited by an applied voltage, and the plunger will prevent the rear wheel stop 49 from rotative movement about hinge 50. The back wheel of car 66 will then rest against rear guard stop 49.

Motor vehicle ramp 24 will rotatively move about spring loaded hinge 27 until the ends of its channels 34 and 35 rest on channels 59 and 60. At the same time pressure switch 56 will come in contact with channel 59 and become actuated which will allow a voltage to be applied to a solenoid in rear guard locking device 52R moving plunger 53R away from underneath rear guard stop 49. The downward pressure of the rear wheel of car 66 will force rear guard stop 49 to rotate about hinge 50 and allow car 66 to roll down motor vehicle platform 24 onto exit platform 30 as seen by the dotted portions in Fig. 1. After the rear wheels of car 66 have cleared the rear wheel stop 49, spring 51 will cause rear wheel stop 49 to return to its original position, however when the front wheels of car 66 come in contact with rear wheel stop 49 it will similarly rotate the rear wheel stop and will not be stopped thereby.

The momentum of car 66 will cause the car to roll completely off motor vehicle storage ramp 24 and up the incline of exit ramp 30. As the weight of car 66 is then removed from motor vehicle storage ramp 24, the compressed spring in spring loaded hinge 27 will cause the ramp to return to its original position. There will now be no pressure on switch 56 and plunger 53R will return to its normal position, that is, underneath rear wheel guard stop 49 which has also returned to its original position as shown in Fig. 1 due to the action of spring 51. The applied voltage to the solenoid of motor vehicle ramp locking device 52R is then removed and the motor vehicle storage ramp is in its locked position.

Although the above described operation is for transferring motor vehicle 66 from motor vehicle storage ramp 24 to exit ramp 30, it can readily be seen that the operation would be identical if the motor vehicle ramp release for any of the motor vehicle storage ramps is excited by an applied voltage. As shown by dotted lines in transferring device 11 of Fig. 1, a motor vehicle is shown rolling down the exit ramp after being lowered from the center storage ramp as seen in the figure.

Reference is now made to Fig. 5 in which there is shown an electrical circuit diagram for motor vehicle ramp locking devices in the transfer and storage device 10 of Fig. 1. Coils 70, 71 and 72 are the solenoids for controlling plungers of the motor vehicle ramp locking devices of motor vehicle storage ramps 24, 25 and 26, respectively, and are connected through switches 73, 74 and 75 to a voltage source. As these switches, which are manually operated, may be positioned closely with respect to each other, mechanical interlocks may be provided to prevent more than one switch from being in the closed position at the same time. Referring now to Fig. 6, there is shown an electrical circuit for coils 76, 77 and 78 connected through pressure switches 56, 56A and 56B to a voltage source. Coils 76, 77 and 78 are the coils of solenoids in rear guard locking devices of ramps 24, 25 and 26 which are operable upon voltage excitation to position their plungers away from under the rear wheel guard stops. Switches 56, 56A and 56B are pressure controlled switches for operating the aforementioned coils by closing the circuit and causing to be applied to the coils an exciting voltage.

The second phase of the operation of the storage and transferring device of this invention is to transfer motor vehicles on the motor vehicle storage ramps so that they occupy consecutive ramps starting from the bottom of the grade or incline of the motor vehicle storage ramps. It was previously described how a motor vehicle on any of the motor vehicle storage ramps may be transferred therefrom to an inclined exit ramp. However it is desirable that all of the motor vehicle storage ramps be capable of storing a motor vehicle at the same time in order to utilize all the available storage space.

Referring now to Fig. 7 there is shown an electrical circuit for transferring motor vehicles on the motor vehicle storage ramps. Interlock contacts 57 and 58 which are insulated from and mounted on motor vehicle storage ramps 24 and segmental support 21 respectively, is in series with interlock contacts 57A and 58A and interlock contacts 57B and 58B, the latter interlock contacts 57B and 58B are insulated from and mounted on the motor vehicle storage ramps and segmental support ramps of the other motor vehicle storage compartments. Let us assume that each storage ramp has a motor vehicle stored thereon. Contacts 47 and 48 are now insulated from and connected to motor vehicle storage ramp 24 and front wheel guard 44 respectively, and similarly contacts 47A and 48A and contacts 47B and 48B are mounted on the other two motor vehicle storage ramps as shown in Fig. 1. Solenoid coil 82 actuates the plunger 53R of rear guard release 52R; solenoid coil 83 actuates plunger 53R1 of rear guard release 52R1; solenoid coil 84 actuates plunger 53R2 of rear guard release 52R2. Solenoid coil 85 actuates plunger 53A of front guard release 52A, and solenoid coil 86 actuates plunger 53B of front guard release 52B. Contacts 90 and 91 are insulated from and mounted on plunger 53 and front wheel guard 44, and contacts 92 and 93 are similarly mounted on plunger 53A and front wheel guard 44A.

If any one of the motor vehicle storage ramps is rotatably lowered about its spring loaded hinge and the motor vehicle thereon transferred to the exit ramp, then its corresponding interlock contacts will be separated and no voltage will be applied to the solenoid coils of Fig. 7 and this circuit will be inoperative. When all interlock contacts are closed and if, let us say, there is no motor vehicle on motor vehicle storage ramp 24, then the front wheel guard will be positioned so that contacts 47 and 48 are closed and contacts 90 and 91 are open. Solenoid coils 82 and 85 will be energized by the voltage source removing plungers 53R and 53A from rear wheel stop 49 and front wheel stop 44A and allow a motor vehicle on motor vehicle ramp 25 to roll down the incline to storage ramp 24. As contacts 90 and 91 are open the other solenoid coils of the circuit will not be energized, thereby preventing more than one motor vehicle to roll at one time. It may thus be seen if there are no motor vehicles on a motor vehicle storage ramp then no pressure will be applied on the front wheel stops of the storage ramp and the wheel guard locking device of the ramp and the front wheel locking device of the next ramp up the incline will be electrically energized for allowing a motor vehicle in the next storage ramp to be released and roll down the inclined storage ramp. Accordingly, motor vehicles will be consecutively stored on the storage ramps up the incline thereof, and if a motor vehicle in any of the storage ramps is transferred to the exit ramp, then motor vehicles stored up the storage ramp incline will consecutively move down the storage ramp incline.

It will have been noted that both solenoid coils 76 and 82 operate, when voltage is applied thereto, to actuate plunger 53R. Locking device 52R contains both these coils which are wound so that upon exciting any one of these coils, plunger 53R will be actuated. Locking devices 52R1 and 52R2 contain coils 77 and 83, and coils 78 and 84 which are similarly wound.

Thus it may be seen that when motor vehicles, having their brakes released and out of gear, are placed on the storage ramps, they will roll down the storage ramps and occupy consecutive storage ramps up the incline of the storage ramps. If a motor vehicle on any one of the storage ramps is transferred to the exit ramp then the motor vehicles up the incline of the storage ramps will consecutively move down the incline.

In Fig. 1, motor vehicle transfer and storage device 10 is shown to contain three storage ramps, however, any number of storage ramps may be constructed. The structure shown in Fig. 1 has two motor vehicle transfer and storage devices, but any number of motor vehicle transfer and storage devices may be superimposed above the other or placed in parallel with the structure shown.

It is to be additionally noted that the storage ramps may be relatively hinged for allowing the front end of the storage ramps to lower onto the exit ramp and allow a motor vehicle stored thereon to roll forward and continue in that direction down the exit ramp instead of rolling, as described, up and then down the incline of the exit ramp.

What is claimed as new is:

1. An automatic storing and transferring device for motor vehicle comprising: an exit motor vehicle supporting surface inclined for gravitational movement of freely moving motor vehicles placed thereon; and a similarly inclined plurality of supporting surfaces superimposed above the exit motor vehicle supporting surface, said plurality of supporting surfaces communicating with each other for allowing motor vehicles to roll along the plurality of supporting surfaces, each of said plurality of supporting surfaces capable of storing a motor vehicle placed thereon and capable of being rotatively lowered to allow a motor vehicle thereon to roll onto the exit motor vehicle supporting surface, and each of the plurality of supporting surfaces having a first and second end has means connected to the first end for allowing each supporting surface to rotatively lower about the first end, and has releasable means connected to the second end for preventing the supporting surface from lowering.

2. The device according to claim 1 which additionally includes wheel stop means connected to each of the plurality of supporting surfaces for preventing a motor vehicle placed thereon from rolling along the plurality of supporting surfaces.

3. The device according to claim 2 which additionally includes release means for releasing the wheel stop means and allowing a motor vehicle placed on the plurality of supporting surfaces to roll along said plurality of supporting surfaces.

4. The device according to claim 3 which additionally includes automatic means for controlling the release means, said automatic means being responsive to lack of pressure of motor vehicle wheels on the wheel stop means of the plurality of supporting surfaces for activating the release means to release the wheel stop means and allow motor vehicles on the plurality of supporting surfaces to consecutively roll to the next supporting surface down the incline of the plurality of supporting surfaces.

5. A storage and transferring device for motor vehicles comprising: an inclined motor vehicle exit ramp; a plurality of similarly inclined rotatable motor vehicle storage ramps placed end to end for allowing a motor vehicle to roll along the plurality of motor vehicle storage ramps; and means to vertically support the plurality of motor vehicle storage ramps above the motor vehicle exit ramp to allow a motor vehicle on a storage ramp to roll onto the exit ramp when the storage ramp is rotatively lowered.

6. The device according to claim 5 wherein each of the plurality of motor vehicle storage ramps having a first and second end has spring loaded means connected to the first end for allowing each motor vehicle storage ramp to rotatively lower about the first end, and has releasible means communicating with the second end for preventing the motor vehicle supporting surface from rotatively lowering.

7. The device according to claim 6 which additionally includes wheel stop means connected to each of the plurality of motor vehicle storage ramps for preventing a motor vehicle thereon from rolling.

8. The device according to claim 7 which additionally includes release means for releasing the wheel stop means and allowing a motor vehicle on a motor vehicle storage ramp to roll down the incline of the plurality of motor vehicle storage ramps.

9. The device according to claim 8 which additionally includes electrical means for controlling the release means, said electrical means being responsive to lack of pressure of wheels of a motor vehicle on the wheel stop means for actuating the release means to release the wheel stop means and allow a motor vehicle on the next motor vehicle storage ramp up its incline to roll down the incline.

10. An automatic storing and transferring device for motor vehicles comprising: a plurality of inclined supporting surfaces placed end to end for allowing a motor vehicle thereon to roll down the incline of the plurality of supporting surfaces due to the force of gravity, each of said supporting surfaces having a segmental ramp and a motor vehicle storage ramp rotatively connected thereto; a similarly inclined exit supporting surface; and means to vertically support each segmental ramp of the plurality of supporting surfaces above the exit supporting surface to allow a motor vehicle on a motor vehicle storage ramp to roll onto the exit supporting surface when the storage ramp is rotatively lowered.

11. A device according to claim 10 wherein each of the plurality of supporting surfaces and the exit supporting surface includes spaced channels for receiving wheels of a motor vehicle.

12. A device according to claim 11 which includes selectively releasable means connected to the plurality of supporting surfaces for preventing and selectively allowing each of the motor vehicle storage ramps of the plurality of supporting surfaces from rotatively lowering about its segmental ramp.

13. A device according to claim 12 wherein each of the motor vehicle storage ramps is rotatively connected to its segmental ramp by means of a spring loaded hinge which will allow each motor vehicle storage ramp to rotatively lower to the exit supporting surface due to the weight of a motor vehicle, and will return to its original position when the weight of the motor vehicle is removed.

14. A device according to claim 13 wherein each of the motor vehicle storage ramps has a front wheel stop rotatively hinged and spring loaded thereto, a releasable front wheel stop locking device to prevent rotational movement of the front wheel stop, a back wheel stop rotatively hinged and spring loaded thereto, a releasable back wheel stop locking device to prevent rotational movement of the back wheel stop.

15. A device according to claim 14 which additionally includes electrical means for controlling the releasable front wheel locking devices and back wheel locking devices to allow rotational movement of the front wheel and back wheel stops, said electrical means being responsive to lack of pressure of the wheels of a motor vehicle on the front wheel stop of a motor vehicle storage ramp to release the locking devices to allow a motor vehicle on the next motor vehicle storage ramp up the incline of the plurality of supporting surfaces to roll down the incline.

16. A device according to claim 15 wherein each of the motor vehicle storage ramps includes wheel stop release means to release wheel stop locking devices on the motor vehicle storage ramp when it is rotatively lowered to the exit supporting surface in order to allow a motor vehicle on the motor vehicle storage ramp to roll onto the exit supporting surface.

17. A storage and transferring device for motor vehicles comprising: an inclined motor vehicle exit supporting surface; a plurality of similarly inclined motor vehicle supporting surfaces placed end to end for allowing a motor vehicle thereon to roll down the incline of the plurality of supporting surfaces due to the force of gravity, each of said supporting surfaces having a segmental ramp, a motor vehicle storage ramp, means connecting the motor vehicle storage ramp to the segmental ramp to allow the motor vehicle storage ramp to rotatively lower to the motor vehicle exit supporting surface due to the weight of a motor vehicle, and to return to its original position when the weight of a motor vehicle is removed, releasible means communicating with the motor vehicle storage ramp for preventing it from rotatively lowering due to the weight of a motor vehicle, wheel stop means connected to the motor vehicle storage ramp for preventing a motor vehicle thereon from rolling, and automatic means for selectively actuating said releasible means to allow the motor vehicle storage ramp to rotatively lower due to the weight of a motor vehicle thereon, for releasing the wheel stop means to allow a motor vehicle on the motor vehicle ramp to roll onto the motor vehicle exit supporting surface when the motor vehicle storage ramp is rotatively lowered, and for releasing the wheel stop means to allow a motor vehicle on the next motor vehicle storage ramp up its incline to roll down the incline when a motor vehicle is not on the motor vehicle storage ramp; and means to vertically support each segmental ramp of the plurality of supporting surfaces above the exit supporting surface to allow a motor vehicle in a motor vehicle storage ramp to roll onto the exit supporting surface when the storage ramp is rotatively lowered.

References Cited in the file of this patent

UNITED STATES PATENTS

| | | |
|---|---|---|
| 1,667,467 | Young | Apr. 24, 1928 |
| 1,890,796 | Stearns | Dec. 13, 1932 |
| 1,906,773 | Scott | May 2, 1933 |
| 1,959,468 | Frost et al. | May 22, 1934 |
| 2,633,253 | Martin | Mar. 31, 1953 |
| 2,662,651 | Anderson | Dec. 15, 1953 |
| 2,681,738 | Granath | June 22, 1954 |